(12) United States Patent  (10) Patent No.: US 9,167,313 B1
Bacco  (45) Date of Patent: Oct. 20, 2015

(54) METHODS AND SYSTEM FOR TRANSFERRING DATA FOR REMOTE STORAGE

(75) Inventor: Edward M. Bacco, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 214 days.

(21) Appl. No.: 13/283,417

(22) Filed: Oct. 27, 2011

(51) Int. Cl.
*H04N 7/18* (2006.01)
*H04N 21/81* (2011.01)
*H04N 21/258* (2011.01)
*H04N 21/262* (2011.01)
*H04N 21/442* (2011.01)
*H04N 7/173* (2011.01)
*H04N 7/00* (2011.01)

(52) U.S. Cl.
CPC ....... *H04N 21/812* (2013.01); *H04N 21/25866* (2013.01); *H04N 21/26208* (2013.01); *H04N 21/442* (2013.01); *H04N 7/002* (2013.01); *H04N 7/17318* (2013.01)

(58) Field of Classification Search
CPC ....... H04N 5/228; H04N 5/783; H04N 7/173; H04N 7/12; H04N 7/18
USPC ...................... 725/82, 91–95, 103, 109–110, 725/114–115; 348/231, 231.2, E5.031
See application file for complete search history.

(56) References Cited

U.S. PATENT DOCUMENTS

| 7,047,309 | B2 * | 5/2006 | Baumann et al. ............. 709/232 |
| 7,885,330 | B2 | 2/2011 | Golas et al. |
| 2002/0059621 | A1 * | 5/2002 | Thomas et al. ................. 725/87 |
| 2002/0110149 | A1 * | 8/2002 | Roberts et al. ................ 370/477 |
| 2003/0133411 | A1 * | 7/2003 | Ise et al. ......................... 370/230 |
| 2005/0155072 | A1 | 7/2005 | Kaczowka et al. |
| 2008/0178238 | A1 * | 7/2008 | Khedouri et al. ............. 725/109 |
| 2009/0064252 | A1 | 3/2009 | Howarter et al. |
| 2009/0103455 | A1 * | 4/2009 | Balasubramanian et al. 370/254 |
| 2011/0187895 | A1 * | 8/2011 | Cheng et al. ............... 348/231.2 |
| 2012/0079520 | A1 * | 3/2012 | Weaver et al. .................. 725/14 |

\* cited by examiner

*Primary Examiner* — Brian T Pendleton
*Assistant Examiner* — Alan Luong
(74) *Attorney, Agent, or Firm* — Robert C. Kowert; Meyertons, Hood, Kivlin, Kowert & Goetzel, P.C.

(57) ABSTRACT

A method of transferring video data for storage at a remote location includes storing the video data recorded at a site to a local storage device at the site. The local storage device is coupled to a remote storage device by way of a network connection. Available bandwidth of the network connection between the local storage device and the remote storage device is automatically monitored. Upon one or more predetermined criteria being met for available bandwidth, video data from the local storage device is transferred to the remote storage device over the network connection. The time of initiation of transfer of the video data or the rate of transfer of the video data over the network connection may be based on the available bandwidth of the network connection at one or more times.

32 Claims, 8 Drawing Sheets

METHODS AND SYSTEM FOR TRANSFERRING DATA FOR REMOTE STORAGE

BACKGROUND

Network Video Recorders (NVRs) are a recording solution used in the security industry. Network video recorders can be used to store video from security cameras (such as closed circuit television ("CCTV") cameras) acquired at a location such as a business, school, retail facility, data center, or other location, on a storage device such as a hard disk drive. A typical network video recorder may store video for a limited time period, such as 7 days. When additional storage capacity is required to meet regulatory standards, additional memory may need to be added by acquiring additional hard disk drives. This approach can be expensive because of the cost of hard disk drives. In addition, the scalability of the systems is limited, for example, because of finite rack space available at a site that can be dedicated to a security system. In addition, spinning hard disk drives have a limited service life, which may be around 3 years before failure.

A remote storage system, such as may be available in a cloud computing environment, can provide large amounts of storage capacity. To transfer video data from the site at which video is acquired to the cloud over a network, however, large amounts of network bandwidth may be required. In addition, the bandwidth available to transfer data over a network connection can vary dramatically from moment to moment traffic as traffic on the network ebbs and flows. Excessive loads on a network connection can result in a complete failure of the connection.

Compression can be used to reduce the storage requirements for video data. NVR and camera manufacturers have implemented some standards for compression, including H.264 and MPEG-4. Even with such compression, however, the demands on a network connection at peak times can result in failure of a network connection.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of system and methods for transferring data over a network for storage at a remote location are described. According to one embodiment, a method of transferring video data for storage at a remote location includes storing the video data recorded at a site to a local storage device at the site. The local storage device is coupled to a remote storage device by way of a network connection. Available bandwidth of the network connection between the local storage device and the remote storage device is automatically monitored. Upon one or more predetermined criteria being met for available bandwidth, video data from the local storage device is transferred to the remote storage device over the network connection. The time of initiation of transfer of the video data or the rate of transfer of the video data over the network connection may be based on the available bandwidth of the network connection at one or more times.

According to one embodiment, a method of transferring data for storage at a remote location includes storing data acquired at a site to a local storage device at the site. The local storage device is coupled to a remote storage device by way of a network connection. A measure of the load on the network connection is automatically monitored. Upon one or more predetermined criteria being met for the load, data from the local storage device is automatically transferred to the remote storage device over the network connection. The time of initiation of transfer of the data or the rate of transfer of data over the network connection is based on the measure of the load on the network connection at one or more times.

According to one embodiment, a system for storing data includes one or more video recording devices at a site, one or more local storage devices at the site, one or more remote storage devices at a location other than the site, and a communication network. The communication network provides a network connection between the local storage devices and the remote storage devices. A data transfer management system at the site automatically monitors available bandwidth on the network connection between the local storage devices at the site and the remote storage devices. Data is automatically transferred from the local storage devices to the remote storage devices. The time of initiation of transfer of the data or the rate of transfer of the data over the network connection is based on the available bandwidth of the network connection at one or more times.

According to one embodiment, a device includes a video data transfer manager that automatically monitors a load on a network connection between a local storage device at a site and a remote storage device at another location. The video data transfer manager automatically transfers video data from the local storage devices to the remote storage device based on load levels on the network connection. The time of initiation of transfer of the data or the rate of transfer of the data over the network connection may be based on loads on the network connection at one or more times.

As used herein, "load", as applied to a network connection or other network resource, means an amount of data transferred over the network connection at a particular time or a particular period of time. Loads may be measured, determined, and expressed in absolute terms (such as bits per second), or relative to a total capacity of a resource.

As used herein, "site" means a physical site, physical location, facility, or building or set of buildings. Examples of sites include a data center campus, office facility, fulfillment center, retail mall, or school campus. A site may include two or more buildings within a physical area. A site may be indoors, outdoors, or a combination thereof.

As used herein, "bandwidth", as applied to a system, communication channel, or network connection, means a measure of an amount of data that can be transferred in a given amount of time. Bandwidth may be expressed in units such as bits per second, bytes per second, or a multiplier thereof. Bandwidth may be assessed for a particular network connection, such as a network connection between a computer system located at a particular site and cloud computing resources.

As used herein, "total bandwidth", as applied to a system, communication channel, or network connection, refers to the total maximum rate of data transfer for the system, communication channel, or network connection.

As used herein, "available bandwidth", as applied to a system, communication channel, or network connection, refers to the bandwidth available in the system, communication channel, or network connection, at a given time. Available bandwidth may be represented or assessed, in various embodiments, in absolute terms (such as bits per second) or in relative terms, such as a fraction or percentage of total bandwidth (for example, 40% of the total bandwidth of a communication channel).

As used herein, "consumed bandwidth", as applied to a system, communication channel, or network connection, refers to the bandwidth consumed in the system, communication channel, or network connection, at a given time. Consumed bandwidth may be expressed in absolute terms (such as bits per second) or in relative terms, such as a fraction or percentage of total bandwidth (for example, 60% of the total bandwidth of a communication channel). The sum of consumed bandwidth and available bandwidth may be total bandwidth of a system.

As used herein, "solid state memory" includes memory that does not have moving parts. Examples of solid-state memory include electrically erasable programmable read-only memory (EEPROM), dynamic random-access memory (DRAM), and flash memory. Flash memory may include, for example, NAND flash and NOR flash.

As used herein, "solid state storage device" means a device that includes solid state memory that can be used to store data. Examples of solid-state storage devices include flash drives, USB thumb drives, SD cards, micro SD cards, Memory Stick, SmartMedia, CompactFlash, and MultiMediaCard (MMC).

As used herein, "computing" includes any operations that can be performed by a computer, such as computation, data storage, data retrieval, or communications.

As used herein, "computing device" includes any of various devices in which computing operations can be carried out, such as computer systems or components thereof. One example of a computing device is a rack-mounted server. As used herein, the term computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. Some examples of computing devices include e-commerce servers, network devices, telecommunications equipment, medical equipment, electrical power management and control devices, and professional audio equipment (digital, analog, or combinations thereof). In various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

As used herein, "data center" includes any facility or portion of a facility in which computer operations are carried out. A data center may include servers dedicated to specific functions or serving multiple functions. Examples of computer operations include information processing, communications, testing, simulations, power distribution and control, and operational control.

In various embodiments, video data acquired at a site is initially stored locally at the site, then opportunistically transferred to a remote location (such as a cloud data storage facility) based on loads on a network connection to the site. The rate of utilization of the network connection between the local storage device and a remote storage device may be monitored. Data can be transferred over the network connection based on bandwidth availability for the network connection. Predetermined criteria may be used to determine when to initiate transfer and/or the rate of transfer. In some embodiments, data transfer occurs during periods of low-utilization for the network connection.

Figure 1:
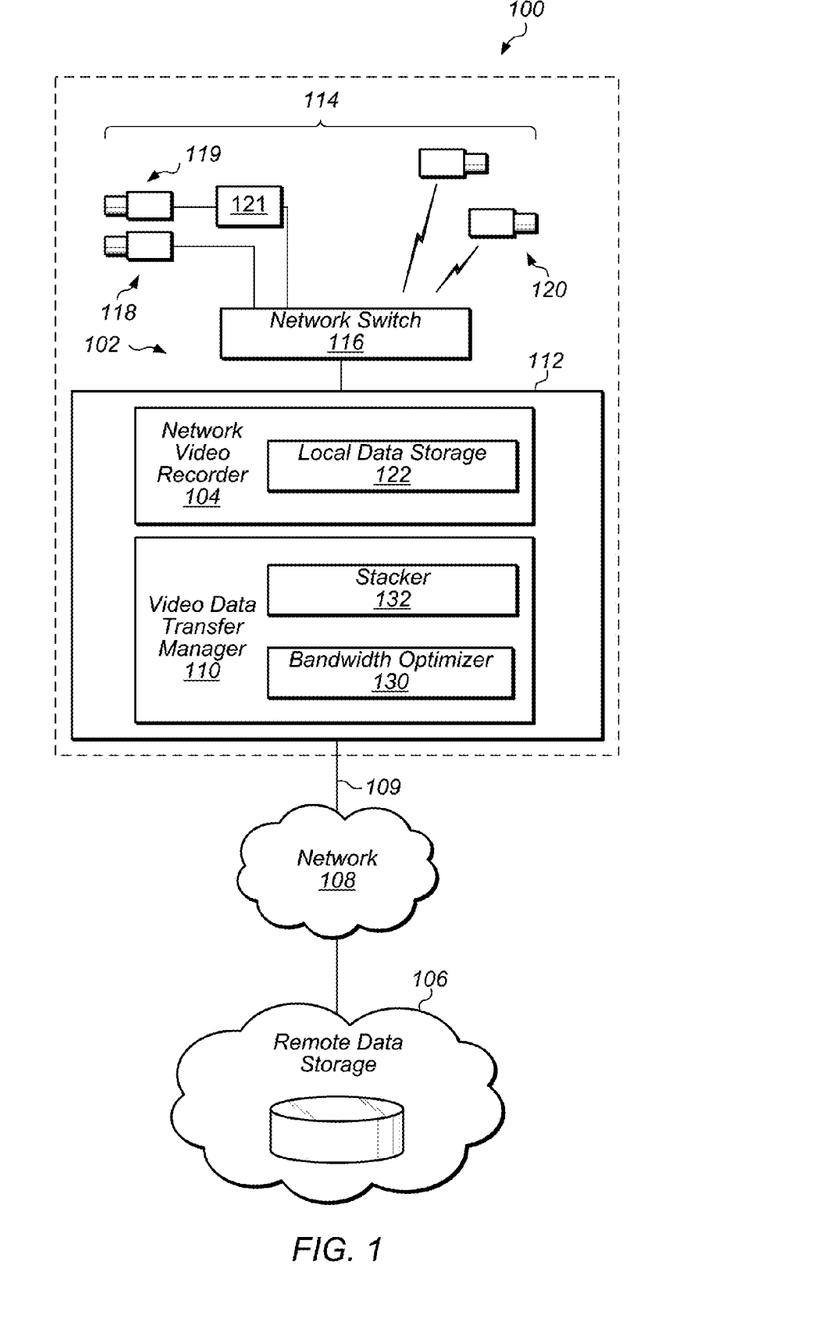
FIG. 1 illustrates one embodiment of a video recording system at a site, with a network connection to remote data storage.

FIG. 1 illustrates one embodiment of a video recording system with a network connection to remote data storage. System 100 includes video recording system 102, network 106, and remote storage system 108. Video recording system 102 is located at site 104. Video recording system 102 is connected to remote storage system 106 by way of network 108 and network connection 109. In some embodiments, remote storage system 106 is provided in the form of cloud data storage.

Video recording system 102 may include various components and systems for acquiring, transferring, processing, and storing video data. Video recording system 102 includes data transfer management device 110, network video recorder 112, cameras 114, and network switch 116. Cameras 114 include closed circuit television cameras 118 and wireless cameras 120. Closed circuit television cameras 118 and wireless cameras 120 are coupled to network video recorder 112 by way of network switch 116.

Closed circuit television cameras 118 and wireless cameras 120 capture video at site 104. Closed circuit television cameras 118 and wireless cameras 120 may be placed at various locations at the site. In some embodiments, video recording system 102 is a surveillance system for a site. Closed circuit television cameras 118 and wireless cameras 120 may be security cameras. Sites may be any of various public, private, or semi-private locations. Examples of a site include an apartment complex, a computing facility, a park, a shopping center, a sports venue, a factory, a business office, or a residence. In addition to security and surveillance, video and data storage systems such as described herein may, in various embodiments, be used in a variety of other applications, including retail, marketing, traffic monitoring, traffic control, law enforcement, logistics management, consumer media, and utilities monitoring.

Cameras in a video recording system may be any of various types, including closed circuit television ("CCTV"), internet protocol ("IP") camera, wireless IP camera, analog camera, pan-tilt-zoom camera, or dome camera. Cameras 114 may be connected to network video recorder 112 over any suitable medium, such as electrical or optical cable, or via any suitable wireless standard such as IEEE 802.11 ("Wi-Fi"), IEEE 802.16 ("WiMax"), etc. Closed circuit television cameras 118 may be analog, digital, or combination of both. In some embodiments, camera 119 is an analog camera coupled to encoder 121. Encoder 121 may convert an analog signal from camera 119 to a digital signal. The output from encoder 121 may be fed to network video recorder 112 by way of network switch 116.

Network video recorder 112 may store video data acquired from closed circuit television cameras 118 and wireless cameras 120. In some embodiments, network video recorder 112 compresses video data acquired by closed circuit television cameras 118, wireless cameras 120, or both. In some embodiments, compression is performed in accordance with a standard, such as H.264 or MPEG-4. In certain embodiments, video data is further compressed prior to being transferred to a remote storage location over a network.

Video data acquired using cameras 114 may be encoded and processed. Encoding and processing of video data may be carried out in the camera devices, in the network video recorder, in another device, or combination thereof.

Network video recorder 112 includes data storage devices 122. Data storage devices 122 may be any of various types of storage devices. In some embodiments, data storages devices 122 are mass storage devices. Examples of data storage devices include hard disk drives, solid state data storage devices, optical drives, magnetic tape drives, and magneto-optical drives. Data storage devices 122 may be used to store video data from cameras 114 locally at sites 104.

In some embodiments, network video recorder 112 stripes data across multiple data storage devices 122. Network video recorder 112 may implement various data striping techniques. Segments of data may be accessed from the data storage devices concurrently, sequentially, or a combination thereof. Data striping may be, in various embodiments, carried out at a byte-level or a block level.

In some embodiments, data striping is carried out in a multi-channel data storage system. Multiple data storage devices may be coupled to each of the channels. In one embodiment, each channel corresponds to one or more rows or columns of storage devices in an array.

In certain embodiments, data striping includes redundant storage. In certain embodiments, multiple storage devices are implemented as Redundant Array of Inexpensive Disks (RAID). Examples of RAID levels that may be used include RAID 0, RAID 4, RAID 5, or RAID 10.

In certain embodiments, all of the data storage devices at a site are solid state devices, such as flash drives.

Video data transfer management device 110 includes bandwidth optimizer 130 and stacker 132. Bandwidth optimizer 130 may control transfer of video data from network video recorder 112 to remote storage on cloud computing system 106. Stacker 132 may manage files to be transferred to remote storage. In some embodiments, video data transfer management device 110 is integrated into a network video recorder. In one embodiment, video data transfer management device 110 and network video recorder 112 are provided as a unit (for example, in a common enclosure).

Video data transfer management device 110 may control transfer of video data from data storages devices 122 of network video recorder 112 to remote storage in remote storage system 106. Bandwidth optimizer 130 may serve as a data transfer controller for transferring data from network video recorder 112 to remote storage. In some embodiments, bandwidth optimizer 130 monitors available bandwidth on network connection 109 between video recording system 102 and cloud computing system 106. Upon predetermined criteria being met for available bandwidth, video data is transferred, by way of network connection 109, from data storage device 122 to remote storage devices in remote storage system 106. The time of initiation of transfer of the video data over the network connection, the rate of transfer of the video data, or both, may be based on level of utilization or available bandwidth of the network connection.

Figure 2:
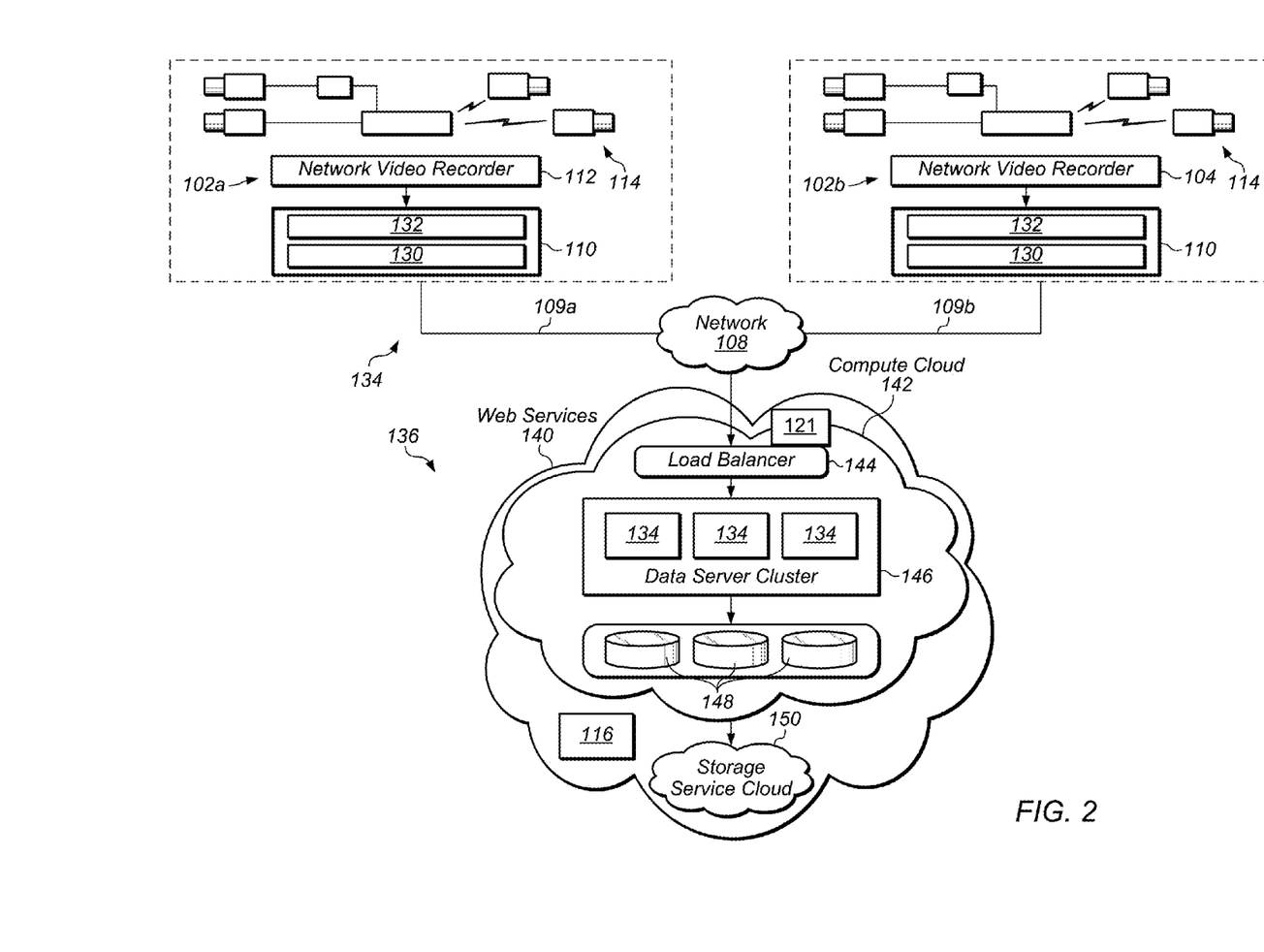
FIG. 2 illustrates one embodiment of video recording systems at multiple sites, each with a network connection to remote data storage.

FIG. 2 illustrates one embodiment of a system including video recording systems at multiple sites, each with a network connection to remote data storage. System 134 includes video recording systems 102a, 102b. Each of video recording systems 102a, 102b may be located at a different one of sites 104a, 104b. Each of video recording systems 102a, 102b are connected to cloud computing system 136 by way of a separate network connection 109a, 109b. Video recording system 102a may monitor and control loads on network connection 109a. Video recording system 102b may monitor and control loads on network connection 109b.

Although only two sites are depicted in FIG. 2 for illustrative purposes, a system may include any number of video recording systems, with any number of cameras or NVRs, at any number of sites. In some embodiments, one site has two or more NVRs.

Cloud computing system 136 may provide remote computing resources and remote storage resources for systems connected to cloud computing system 106. For example, cloud computing system 136 may provide web services 140 to customers operating video recording systems 112. Web services 140 include compute cloud 142. Compute cloud 142 includes load balancer 144, storage server cluster 146, and storage devices 148. Compute cloud 142 may access storage services by way of storage services cloud 150.

Block storage servers 154 in storage server cluster 146 may provide block level storage volumes. Block storage servers 154 may be used for applications that require a database, file system, or access to raw block level storage. In some embodiments, a storage volume is attached to a running computing cloud instance and exposed as a device within the instance. A block storage volume may be off-instance storage that persists independently from the life of an instance.

In one embodiment, block storage volumes are created in a particular availability zone in compute cloud 142. Block storage volumes may be any size. In some embodiments, block storage volumes range from 1 GB to 1 TB in size. Once a volume is created, the volume can be attached to a computing cloud instance in the same availability zone. Once attached, a volume may appear as a mounted device similar to any hard drive or other block device.

In some embodiments, load balancer 144 automatically distributes incoming application traffic. Traffic may be automatically balanced, for example, across multiple computing cloud instances and multiple availability zones. Load balancer 144 may ensure that only healthy instances receive traffic. In some embodiments, load balancer 144 detects unhealthy instances within a pool and automatically reroutes traffic to healthy instances until the unhealthy instances have been restored.

Cloud monitor system 160 monitors cloud resources and the applications customers run using web services 140. Monitor system 160 may monitor computing cloud instances, storage volumes, load balancer 144, and relational database instances. Metrics that may be monitored include, in various embodiments, CPU utilization, latency, request counts, memory usage, transaction volumes, and error rates.

In some embodiments, storage services cloud 150 provides durable storage infrastructure for video data. Objects may be redundantly stored on multiple devices across multiple facilities in one or more geographic regions.

Once stored, storage services cloud 150 may detect and repair any lost redundancy. Storage services cloud 150 may periodically verify the integrity of data stored using checksums. If corruption is detected, the corrupt elements may be repaired using redundant data. In addition, storage services cloud 150 may calculates checksums on all network traffic to detect corruption of data packets when storing or retrieving data.

In some embodiments, storage services cloud 150 writes, reads, and deletes objects having from 1 byte to 5 terabytes of data each. Each object may be stored in a bucket and retrieved via a unique, developer-assigned key. Authentication mechanisms may be provided to ensure that data is kept secure from unauthorized access. Objects can be made private or public.

Each bucket can be stored in one of several geographic regions. A region may be selected to minimize latency, to address regulatory requirements, or other criteria.

Network 108 may include any suitable data network or combination of networks that allow transfer of content between computing devices at sites 104 and a cloud computing system 106. For example, network 108 may include one or more Local Area Networks (LANs) such as Ethernet networks, as well as Wide Area Networks (WANs), Metropolitan Area Networks (MANs), or other data or telecommunication networks implemented over any suitable medium, such as electrical or optical cable, or via any suitable wireless standard such as IEEE 802.11 ("Wi-Fi"), IEEE 802.16 ("WiMax"), etc. In various embodiments, all or a portion of network 108 may encompass the network infrastructure commonly referred to as the Internet. In other embodiments, network 108 may be entirely contained within an enterprise and not directly accessible from the Internet.

In some embodiments, a data transfer manager controls the transfer of data from video recording systems at two or more different sites. In certain embodiments, data transfer from two or more different sites to remote storage over a network connection may be commonly controlled, coordinated, or synchronized based on traffic levels on one or more network connections.

Figure 3:
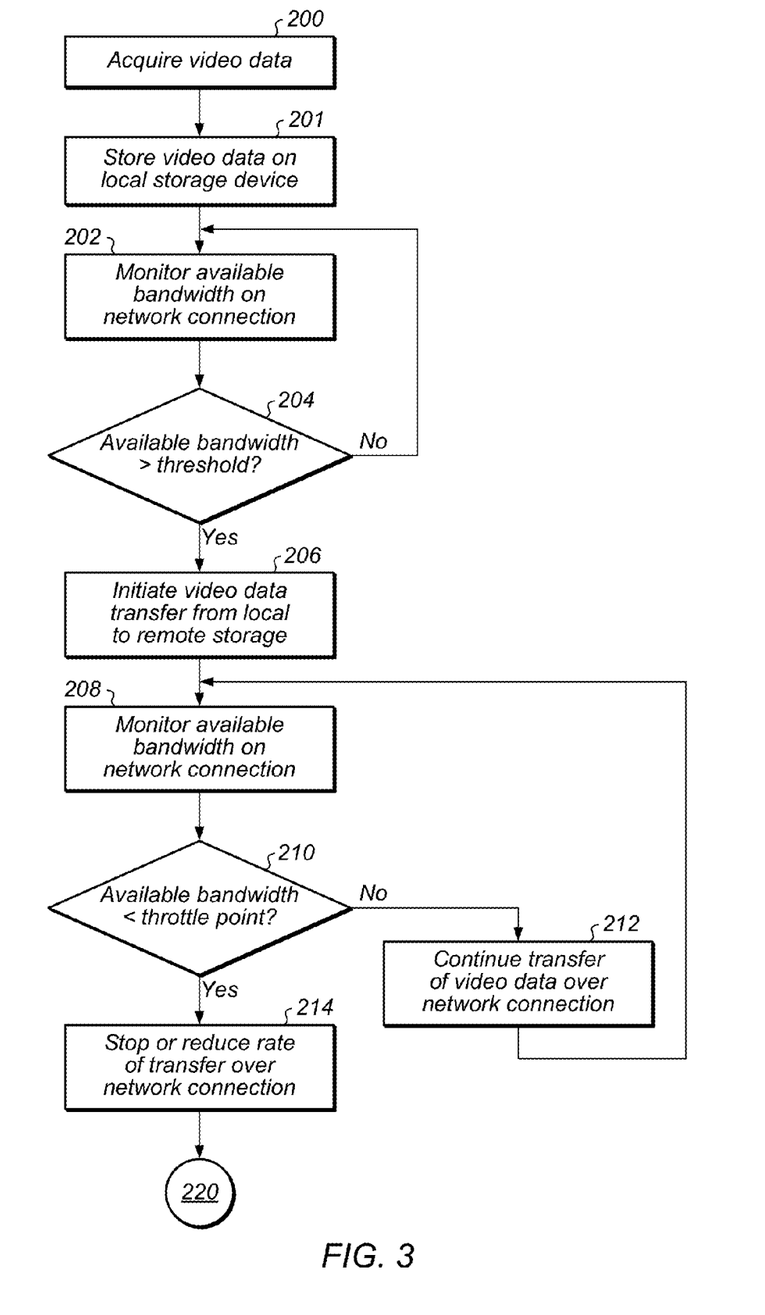
FIG. 3 and FIG. 4 illustrate embodiments of transferring video data to a remote data storage location according to one embodiment.
Figure 4:
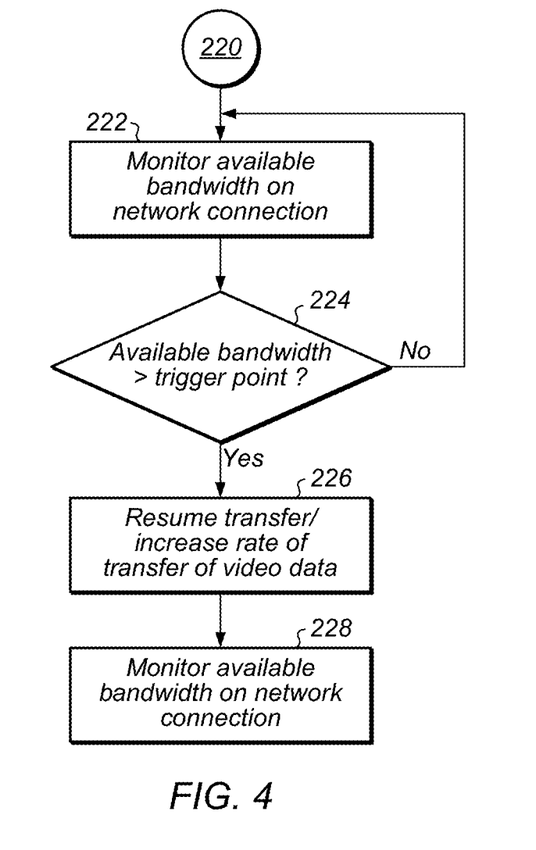

FIG. 3 and FIG. 4 illustrate embodiments of transferring video data to a remote data storage location. In some embodiments, traffic over a network connection is dynamically adjusted based on available bandwidth or traffic over a network connection.

At 200, video data may be acquired. The data may be acquired at a site such as an office, school, retail location, or other location. In some embodiments, video data is acquired using cameras at a site, such as security cameras of a surveillance system.

At 201, the acquired video data is stored on a local storage device. The local storage device may be included in a network video recorder at the site at which the video data is acquired. In some embodiments, video data is stored on solid state storage devices in a network video recorder at a site.

At 202, available bandwidth on a network connection between the local storage device and a remote storage location is monitored. The network connection may be provided from the local storage device over a network such as network connection 109 described above relative to FIG. 1. Remote data storage may be, for example, data storage in a cloud storage environment. In some embodiments, available bandwidth is assessed as a portion of a total bandwidth over a network connection.

At 204, if available bandwidth reaches a threshold, a transfer of data is initiated over the network connection from the local storage device to a remote storage location at 206. In some embodiments, a threshold may be established as a percentage of total bandwidth for a network connection to a local storage device. For example, in various embodiments, data transfer over a network connection may be initiated if the available bandwidth meets or exceeds 20% or more of the total bandwidth for a network connection, 50% or more of the total bandwidth for a network connection, or 80% or more of the total bandwidth for a network connection.

In some cases, available bandwidth may tend to be greater in off-hours, such as the middle of the night. A system, nevertheless, may in various embodiments monitor traffic at any time of day, and initiate transfer whenever bandwidth is available on the network connection.

As long as the available bandwidth threshold has not been met, available bandwidth may continue to be monitored on the network connection at 202.

At 208, available bandwidth may continue to be monitored as video data is transferred over the network connection. At 210, if available bandwidth remains above a throttle point (for example, 10% or more of the total bandwidth), transfer of video data from the local storage device to the remote storage device may be continued over the network connection. Available bandwidth may continue to be monitored while data transfer continues. If available bandwidth drops below the throttle point, transfer of video data may be stopped or the rate of transfer may be reduced. For example, if available bandwidth drops below 10%, the rate of transfer of video data may be reduced.

Turning to FIG. 4, after video data transfer over the network has been stopped or the rate of transfer reduced, available bandwidth may continue to be monitored on the network connection at 222. At 204, if available bandwidth again reaches a threshold level, transfer of data may be resumed or the rate of data transfer over the network connection may be increased at 226. In some embodiments, the threshold for resuming or increasing data transfer may be the same as the threshold for initiating transfer (for example, as described at 204. In other embodiments, the threshold level for resuming or increasing data transfer is a different threshold than the threshold level for initiating data transfer over the connection.

In some cases, available bandwidth may tend to be greater in off-hours, such as the middle of the night. A system may, nevertheless, monitor traffic at any time of day, and initiate transfer whenever bandwidth is available on the network connection.

As long as the available bandwidth threshold has not been met, available bandwidth may continue to be monitored on the network connection at 228.

In some embodiments, a video data transfer rate is throttled based on the available bandwidth on a network connection. Data transfer rates may be automatically adjusted during transfer to maintain the total bandwidth within a desired range. For example, the video data transfer rate may be maintained such that the transfer rate over the network connection remains between 90% and 95% of capacity of the network connection.

In certain embodiments, a margin of safety for purposes of data transfer may be dynamically determined. The margin of safety may vary, for example, based on criteria such as network traffic or time of day. In one embodiment, a larger factor of safety is applied during periods of relatively high usage as compared with periods of relatively low usage.

Figure 5:
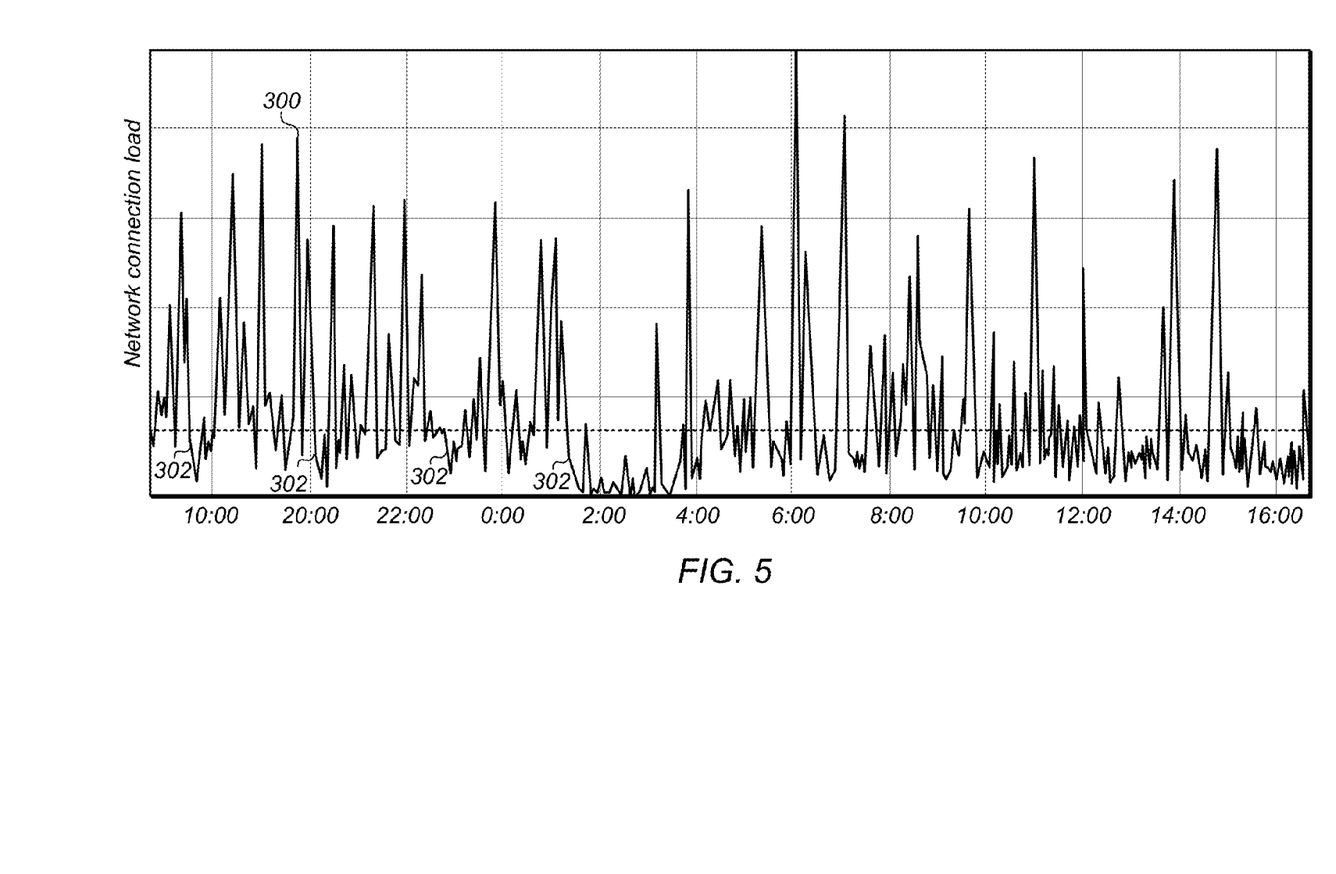
FIG. 5 is a graph illustrating utilization levels on a network connection in one embodiment.

FIG. 5 is a graph illustrating utilization level over time on a network connection in one embodiment. Curve 300 may reflect a monitored level of traffic over the network connection as a function of time. In the graph shown in FIG. 5, periods of relatively low traffic may correspond to relatively high available bandwidth, and vice versa.

In various embodiments, transfer of video data may be carried out during periods of relatively low utilization of a network connection. For example, video transfer may be automatically initiated in valleys 302 of curve 300.

Figure 6:
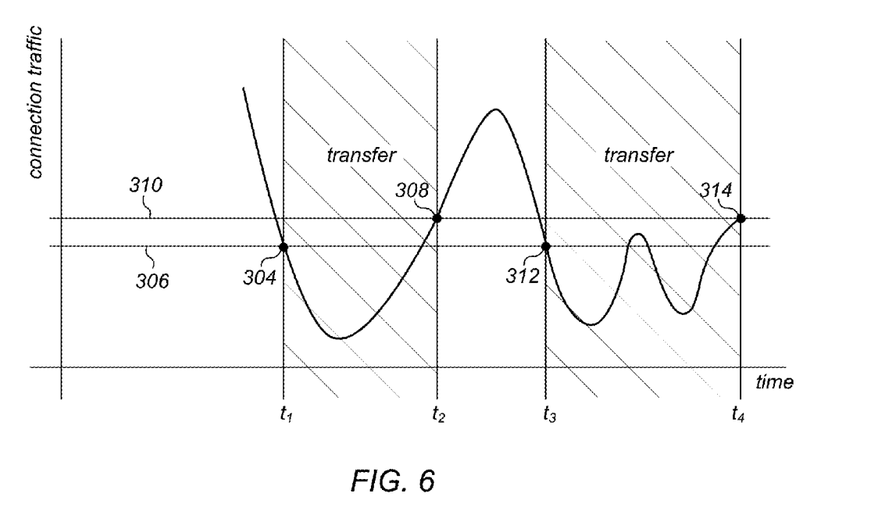
FIG. 6 and FIG. 7 illustrate automatic video data transfer over a network connection based on loads on the network connection according to one embodiment.
Figure 7:
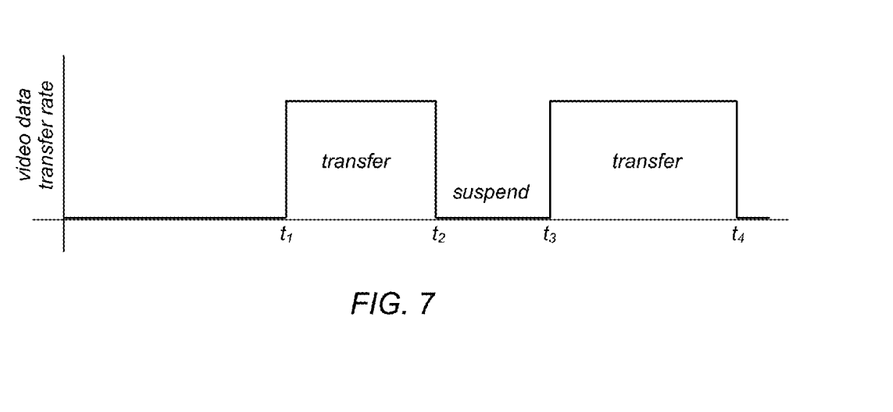

FIG. 6 and FIG. 7 illustrate automatic video data transfer over a network connection based on traffic. In some embodiments, video data transfer is automatically initiated and controlled based on monitored traffic levels and/or available bandwidth. In one embodiment, video data transfer is automatically initiated when available bandwidth exceeds a predetermined threshold and is continued automatically as long as specified criteria are met or no additional data remains to be transferred. For example, in the embodiment shown in FIG. 6, video data transfer may be initiated at point 304 (corresponding to time $t_1$), when traffic drops below transfer threshold level 306, and continued until point 308 (corresponding to time $t_2$), when traffic climbs above throttle level 310. At point 312 (corresponding to time $t_3$), video data transfer may be automatically resumed when traffic again drops below transfer threshold level 306.

Threshold or trigger levels for initiating, throttling, suspending, or resuming data transfer may be based on various suitable criteria and algorithms. In some embodiments, levels are selected to optimize the transfer of a data over the network connection. In some embodiments, a system initiates transfer of data only when the level of usage is relatively low (for example, 20% of capacity of the network connection). In other embodiments, a system initiates transfer of data when the level of usage is relatively high (for example, 95% of capacity of the network connection).

In some embodiments, a throttle is implemented on the transfer of video data from a site over a network connection. The throttle may maintain the load on the network connection within a predetermined range. In one embodiment, the rate of transfer is increased as load approaches a predetermined ceiling level and decreased as the load approaches a predetermined floor level.

Measures of available bandwidth and/or the level of utilization on a network connection may be determined in various manners. In some embodiments, available bandwidth accounts for a margin of safety (for example, relative to the total bandwidth for a network connection). For example, a margin of safety for a network may be 10% of total bandwidth of the network connection. Based on the margin of safety, a system may limit data transfer rates such that the amount of bandwidth consumed does not exceed 90%.

In embodiments described herein, data transferred to remote storage is video data that has been stored locally. Nevertheless, in various embodiments the data transferred may be of other types of data, including still image, audio, textual data, numerical data, or combinations thereof. In certain embodiments, transfer of data streamed directly from a source that is acquiring the data (such as a security camera) is managed using the rate control methods and systems described herein.

Example Service Provider Networking Environments

Various embodiments may be implemented in the context of a service provider that provides storage and other resources to multiple customers. A service provider may provide resources to the customers via one or more services that allow the customers to purchase, rent, or otherwise obtain instances of resources, including but not limited to computation and storage resources, implemented on devices within a service provider network or networks in one or more service provider data centers. The following section describes example service provider network environments in which above-described embodiments of the methods and apparatus for remote storage of video data may be implemented. These example service provider network environments are not, however, intended to be limiting.

Figure 8:
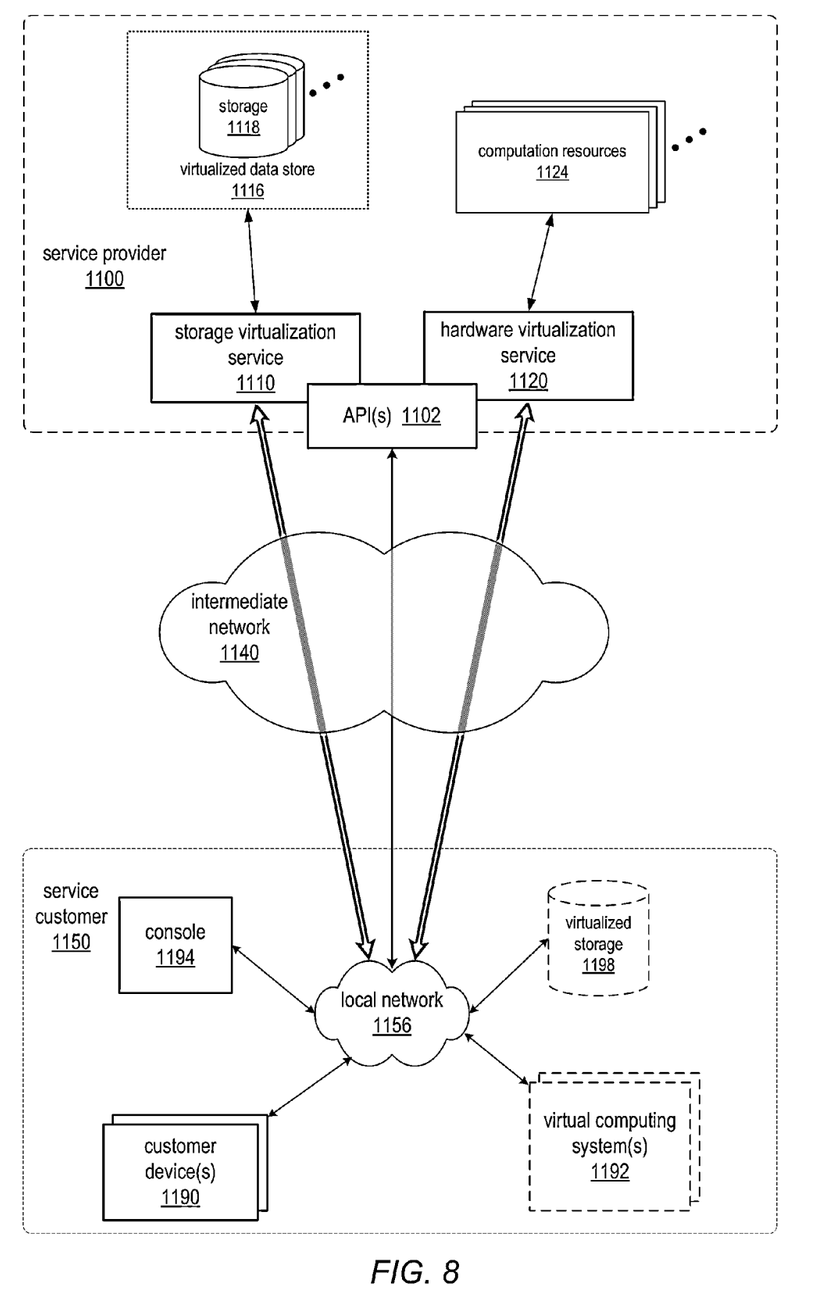
FIG. 8 is a block diagram of an example service provider that provides a storage virtualization service and a hardware virtualization service to customers, according to some embodiments.

FIG. 8 is a block diagram of an example service provider that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the service provider 1100 (e.g., to service customer 1150). Each computation resource 1124 may be provided with one or more private IP addresses. A local network of service provider 1100 may be configured to route packets from the private IP addresses of the computation resources 1124 to public Internet destinations, and from public Internet sources to the computation resources 1124.

Service provider 1100 may provide a service customer 1150, for example coupled to intermediate network 1140 via local network 1156, the ability to implement virtual computing systems 1192 via hardware virtualization service 1120 coupled to intermediate network 1140 and to the local network of service provider 1100. In some embodiments, hardware virtualization service 1120 may provide one or more APIs 1102, for example a web services interface, via which a service customer 1150 may access functionality provided by the hardware virtualization service 1120, for example via a console 1194. In at least some embodiments, at the service provider 1100, each virtual computing system 1192 at customer 1150 may correspond to a computation resource 1124 that is leased, rented, or otherwise provided to service customer 1150.

From an instance of a virtual computing system 1192 and/or another customer device 1190 or console 1194, the customer may access the functionality of storage virtualization service 1110, for example via one or more APIs 1102, to access data from and store data to a virtual data store 1116 provided by the service provider 1100. In some embodiments, a virtualized data store gateway (not shown) may be provided at the service customer 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another customer device 1190, may mount and access virtual data store 1116 volumes, which appear to the user as local virtualized storage 1198.

While not shown in FIG. 8, the virtualization service(s) may also be accessed from resource instances within the service provider 1100 network via API(s) 1102. For example, a customer, appliance service provider, or other entity may access a virtualization service from within a respective private network on the service provider 1100 network via an API 1102 to request allocation of one or more resource instances within the private network or within another private network.

In at least some embodiments, a service provider may also provide, or may allow a third party to provide, load balancers on the service provider network via a load balancer service. For example, a client may launch some number of resource instances (e.g., computation resources or storage resources) in the service provider network, and instruct the load balancer service to place a load balancer in front of the resource instances. The load balancer may then distribute incoming traffic across the resource instances behind the load balancer.

Illustrative System

Figure 9:
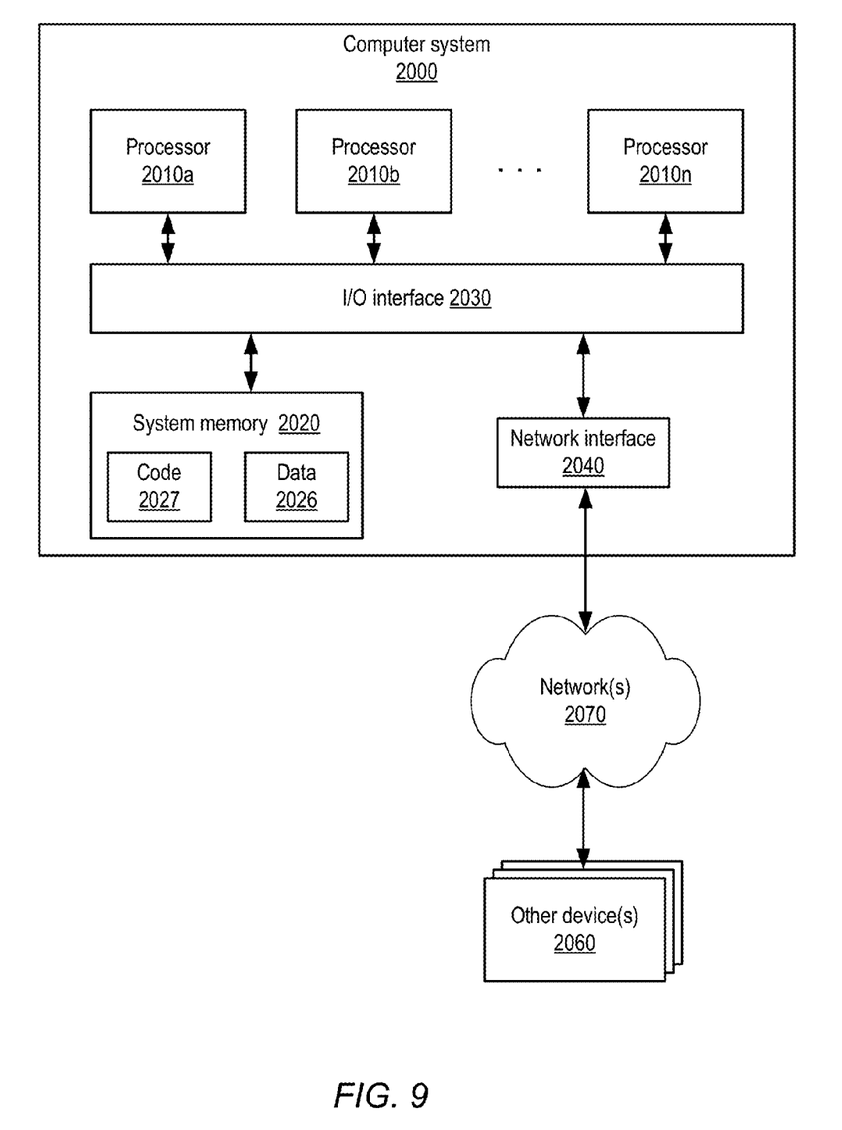
FIG. 9 is a block diagram illustrating an example computer system that may be used in some embodiments.

In some embodiments, a server that implements a portion or all of one or more of the technologies, including but not limited to the various service provider methods and apparatus and the methods and apparatus for remote video data storage as described herein, may include a general-purpose computer system that includes or is configured to access one or more computer-accessible media, such as computer system 2000 illustrated in FIG. 9. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for service provider methods and apparatus and the methods and apparatus for transferring data over a network, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 12, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data for implementing embodiments of data transfer and storage methods as described above relative to FIGS. 1-7. In other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

What is claimed is:

1. A method of transferring video data for storage at a remote location, comprising:
storing video data recorded at a site to a local storage device at the site, wherein the local storage device is coupled to a remote storage device by way of a network connection;
automatically monitoring available bandwidth of the network connection between the local storage device and the remote storage device;
automatically initiate transferring, upon one or more predetermined criteria being met for available bandwidth, at least a portion of the video data from the local storage device to the remote storage device over the network connection, wherein the time of initiation of transfer of the video data over the network connection is based, at least in part, on the available bandwidth of the network connection at one or more times;
subsequent to initiating the transferring, stopping transfer of the portion of the video data if the available bandwidth of the network connection falls below a first predetermined threshold level of available bandwidth, which is associated with stopping video data transfer, subsequent to initiation of the transfer; and
subsequent to available bandwidth of the network connection falling below the first predetermined level of available bandwidth and stopping transfer of the portion of the video data, re-initiating transfer of the portion of the video data if available bandwidth of the network connection rises above a second predetermined threshold level of available bandwidth, which is associated with re-initiating video data transfer;
wherein the first predetermined threshold level of available bandwidth and the second predetermined threshold level of available bandwidth are concurrently different threshold levels of available bandwidth.

2. The method of claim 1, wherein the predetermined criteria comprises meeting or exceeding a minimum threshold available bandwidth for the network connection.

3. The method of claim 1, wherein the automatic transferring of the video data is controlled from the site.

4. The method of claim 1, wherein the remote data storage is cloud data storage.

5. The method of claim 1, wherein the recorded video data is recorded to a network video recorder at the site, wherein the video data is at least partially acquired by security cameras at the site.

6. The method of claim 1, wherein the transferred video data is compressed video data.

7. A method of transferring data for storage at a remote location, comprising:
storing data acquired at a site to a local storage device at the site, wherein the local storage device is coupled to a remote storage device by way of a network connection;
automatically monitoring a measure of a load on the network connection;
automatically initiating a transfer, upon one or more predetermined criteria being met for the load, of at least a portion of the data from the local storage device to the remote storage device over the network connection, wherein the time of initiation of transfer of the data over the network connection is based, at least in part, on the measure of the load on the network connection at one or more times;
subsequent to initiating the transfer, stopping transfer if consumed bandwidth on the network connection rises above a first predetermined threshold level of consumed bandwidth, which is associated with stopping transfer, subsequent to initiation of the transfer; and
subsequent to consumed bandwidth rising above the first predetermined threshold level of consumed bandwidth and stopping transfer, re-initiating transfer if consumed bandwidth on the network connection drops below a second predetermined threshold level of consumed bandwidth, which is associated with re-initiating transfer;
wherein the first predetermined threshold level of consumed bandwidth and the second predetermined threshold level of consumed bandwidth are concurrently different threshold levels of consumed bandwidth.

8. The method of claim 7, wherein the transfer of data from the local storage device is controlled from the site.

9. The method of claim 7, wherein the data comprises video data acquired at the site.

10. The method of claim 7, further comprising dynamically throttling transfer of the data from the at least one local storage device to the remote storage device based, at least in part, on available bandwidth of the network connection.

11. The method of claim 7, further comprising reducing a rate of transfer of data from the local storage device to the remote storage device based on at least one change in available bandwidth of the network connection.

12. The method of claim 7, wherein automatically transferring data from the local storage device to the remote storage device comprises successive transfers of two or more portions of a video file based on available bandwidth.

13. The method of claim 7, wherein the transfer is based on a measure of available bandwidth, wherein the available bandwidth is determined by monitoring consumed bandwidth relative to the total bandwidth for the network connection.

14. The method of claim 7, wherein automatically transferring at least a portion of the data from the local storage device to the remote storage device over the network connection comprises automatically initiating transfer if consumed bandwidth on the network connection falls below a predetermined transfer trigger level.

15. The method of claim 7, wherein automatically transferring at least a portion of the data from the local storage device to the remote storage device over the network connection comprises reducing a rate of transfer based on an increase in consumed bandwidth.

16. The method of claim 7, wherein data on the local storage device is compressed video data.

17. The method of claim 16, further comprising performing a second level of compression of the compressed data before transferring the data to the remote storage device.

18. The method of claim 7, further comprising automatically transferring data from one or more local storage devices at one or more additional sites, wherein the transfer of the data from the local storage device at the site and the transfer of data from a local storage device at least one additional sites is coordinated based on loads on the network connections from site and the one or more additional sites.

19. A system for storing data, comprising:
one or more video recording devices at a site;
one or more local storage devices at the site;
one or more remote storage devices at a location other than the site;

a communication network configured to provide a network connection between at least one of the local storage devices and at least one of the remote storage devices; and a data transfer management system configured to:
automatically monitor available bandwidth on the network connection between the at least one local storage device and the at least one remote storage device;
refrain from initiating transfer, over the network, of data from at least one of the local storage devices to at least one of the remote storage devices in response to the available bandwidth of the network connection being determined to be below a first predetermined threshold level of available bandwidth which is associated with initiating data transfer;
subsequent to the refraining, automatically initiate transfer, over the network, of data from at least one of the local storage devices to at least one of the remote storage devices in response to the available bandwidth of the network connection subsequently rising above the first predetermined threshold level of available bandwidth; and
subsequent to the initiating transfer, automatically stop the transfer of data from the at least one of the local storage devices to the at least one of the remote storage devices in response to the available bandwidth of the network connection subsequently dropping below a second predetermined threshold level of available bandwidth which is associated with stopping data transfer and which is concurrently different from the first predetermined threshold level of available bandwidth.

20. The system of claim 19, wherein the local storage device is a solid state data storage device.

21. The system of claim 19, wherein the data transfer management system comprises a data transfer rate throttle, wherein the data transfer throttle is configured to adjust a rate of transfer from the local storage device to the remote storage device based on available bandwidth of the network connection.

22. The system of claim 19, wherein the data transfer management system is at the site.

23. The system of claim 19, wherein the data transfer management system is at a location other than the site.

24. The system of claim 19, further comprising:
one or more security cameras at the site configured to capture video data at the site; and
one or more network video recorders coupled at least one of the security cameras and configured to store video data from the at least one security camera to the local data storage device.

25. The system of claim 19, wherein the remote data storage is cloud data storage.

26. The system of claim 19, wherein the communication network comprises a bandwidth management system separate from the data transfer management system.

27. The system of claim 19, further comprising a stacker configured to stack one or more files to be transferred from local storage to remote storage.

28. A device, comprising a video data transfer manager configured to:
automatically monitor a load on a network connection between one or more local storage devices at a site and one or more remote storage devices at a location other than the site;
refrain from initiating transfer, over the network, of data from at least one of the local storage devices to at least one of the remote storage devices in response to the available bandwidth of the network connection being determined to be below a first predetermined threshold level of available bandwidth which is associated with initiating data transfer;
subsequent to the refraining, automatically initiate transfer of video data from at least one of the local storage devices to at least one of the remote storage devices in response to available bandwidth of the network connection subsequently rising above the first predetermined threshold level of available bandwidth; and
subsequent to the initiating transfer, automatically stop the transfer of video data from at least one of the local storage devices to the at least one of the remote storage devices in response to available bandwidth of the network connection subsequently dropping below a second predetermined threshold level of available bandwidth which is associated with stopping data transfer and which is concurrently different from the first predetermined threshold level of available bandwidth.

29. The device of claim 28, wherein the device is a network video recorder, wherein the network video recorder comprises at least one local storage device.

30. The device of claim 29, wherein the one or more local storage devices are solid state storage devices.

31. The method of claim 1, wherein:
the first predetermined threshold level of available bandwidth is less than the second predetermined threshold level of available bandwidth; and
the method comprises:
subsequent to stopping transfer of the portion of the video data if the available bandwidth of the network connection falls below the first predetermined threshold level of available bandwidth subsequent to initiation of the transfer, refraining from re-initiating data transfer if available bandwidth of the network connection rises above the first predetermined threshold level of available bandwidth and remains less than the second predetermined threshold level of available bandwidth.

32. The system of claim 19, wherein:
the first predetermined threshold level of available bandwidth is greater than the second predetermined threshold level of available bandwidth; and
the data transfer management system is configured to:
subsequent to the initiating transfer, refrain from automatically stopping the transfer of data from the at least one of the local storage devices to the at least one of the remote storage devices in response to the available bandwidth of the network connection subsequently dropping below the first predetermined threshold level and remaining above the second predetermined threshold level.

* * * * *